United States Patent
Westling et al.

(10) Patent No.: US 10,242,389 B2
(45) Date of Patent: Mar. 26, 2019

(54) COMPUTER NETWORK PAGE ADVERTISING METHOD

(71) Applicant: AT&T Mobility II LLC, Atlanta, GA (US)

(72) Inventors: Mark Westling, Chevy Chase, MD (US); Phillip Wherry, Vienna, VA (US); Craig A. Owensby, Jakarta Selatan (ID)

(73) Assignee: AT&T Mobiliey II LLC, Atlanta, GA (US)

( * ) Notice: Subject to any disclaimer, the term of this patent is extended or adjusted under 35 U.S.C. 154(b) by 0 days.

(21) Appl. No.: 14/040,506

(22) Filed: Sep. 27, 2013

(65) Prior Publication Data

US 2014/0099917 A1    Apr. 10, 2014

Related U.S. Application Data

(63) Continuation of application No. 11/191,172, filed on Jul. 27, 2005, now abandoned, which is a
(Continued)

(51) Int. Cl.
| | |
|---|---|
| *H04M 3/38* | (2006.01) |
| *G06Q 30/02* | (2012.01) |
| *H04M 3/428* | (2006.01) |
| *H04L 29/08* | (2006.01) |
| *H04W 4/24* | (2018.01) |

(52) U.S. Cl.
CPC ......... *G06Q 30/0277* (2013.01); *G06Q 30/02* (2013.01); *G06Q 30/0239* (2013.01); *G06Q 30/0261* (2013.01); *G06Q 30/0269* (2013.01); *H04L 67/04* (2013.01); *H04L 67/14* (2013.01);
(Continued)

(58) Field of Classification Search
USPC ................ 705/413, 26.41; 370/338; 455/410
See application file for complete search history.

(56) References Cited

U.S. PATENT DOCUMENTS

| | | |
|---|---|---|
| 4,850,007 A | 7/1989 | Marino et al. |
| 5,283,731 A | 2/1994 | Lalonde et al. |

(Continued)

FOREIGN PATENT DOCUMENTS

| | | |
|---|---|---|
| EP | 0797368 | 9/1997 |
| EP | 1066867 A2 | 1/2001 |

(Continued)

OTHER PUBLICATIONS

Cell Phone Ads to Replace E-Mail Ads?, http://www.jir.net/jir2_99.html.
(Continued)

*Primary Examiner* — Saba Dagnew
(74) *Attorney, Agent, or Firm* — Hartman & Citrin LLC

(57) ABSTRACT

The invention provides a system for promoting computer network pages. The system includes a mobile station that allows a user to conduct telephone calls and connect to a computer network. A call management server selects and transmits an audible advertisement for a network page to a user, based on profile information of the user. A gateway then causes a menu including a selection choice for connecting to the advertised computer network page to appear on the mobile station when the user connects to the computer network.

19 Claims, 4 Drawing Sheets

Related U.S. Application Data continuation of application No. 09/574,254, filed on May 19, 2000.

(52) U.S. Cl.
CPC .............. *H04L 67/20* (2013.01); *H04L 67/30* (2013.01); *H04W 4/24* (2013.01)

(56) References Cited

U.S. PATENT DOCUMENTS

| | | | |
|---|---|---|---|
| 5,321,740 A | | 6/1994 | Gregorek et al. |
| 5,448,625 A | | 9/1995 | Lederman |
| 5,515,098 A | | 5/1996 | Carles |
| 5,539,395 A | | 7/1996 | Buss et al. |
| 5,546,445 A | | 8/1996 | Dennison et al. |
| 5,572,643 A | * | 11/1996 | Judson .............. G06F 17/30899 379/88.13 |
| 5,572,653 A | | 11/1996 | DeTemple et al. |
| 5,579,535 A | | 11/1996 | Orlen et al. |
| 5,652,784 A | | 7/1997 | Blen et al. |
| 5,673,322 A | | 9/1997 | Pepe et al. |
| 5,694,455 A | * | 12/1997 | Goodman ..................... 455/413 |
| 5,717,923 A | | 2/1998 | Dedrick |
| 5,721,827 A | | 2/1998 | Logan et al. |
| 5,732,216 A | | 3/1998 | Logan et al. |
| 5,752,185 A | | 5/1998 | Ahuja |
| 5,848,396 A | | 12/1998 | Gerace |
| 5,852,775 A | | 12/1998 | Hidary |
| 5,873,068 A | | 2/1999 | Beaumont et al. |
| 5,889,852 A | | 3/1999 | Rosecrans et al. |
| 5,895,471 A | | 4/1999 | King et al. |
| 5,920,826 A | | 7/1999 | Metso et al. |
| 5,933,811 A | | 8/1999 | Angles et al. |
| 5,937,037 A | | 8/1999 | Kamel et al. |
| 5,970,404 A | | 10/1999 | Foti |
| 5,991,735 A | | 11/1999 | Gerace |
| 6,002,450 A | | 12/1999 | Darbee et al. |
| 6,009,150 A | | 12/1999 | Kamel |
| 6,009,409 A | | 12/1999 | Adler et al. |
| 6,009,410 A | | 12/1999 | Lemole et al. |
| 6,014,569 A | | 1/2000 | Bottum |
| 6,018,522 A | | 1/2000 | Schultz |
| 6,018,710 A | | 1/2000 | Wynblatt et al. |
| 6,020,916 A | | 2/2000 | Gerszberg et al. |
| 6,044,403 A | | 3/2000 | Gerszberg et al. |
| 6,050,898 A | | 4/2000 | Vange et al. |
| 6,055,510 A | | 4/2000 | Henrick et al. |
| 6,055,513 A | * | 4/2000 | Katz et al. ................. 705/26.41 |
| 6,055,566 A | | 4/2000 | Kikinis |
| 6,078,807 A | * | 6/2000 | Dunn ..................... H04M 3/38 455/410 |
| 6,091,956 A | | 7/2000 | Hollenberg |
| 6,113,494 A | | 9/2000 | Lennert |
| 6,134,532 A | | 10/2000 | Lazarus et al. |
| 6,157,841 A | | 12/2000 | Bolduc et al. |
| 6,181,927 B1 | | 1/2001 | Welling, Jr. et al. |
| 6,208,866 B1 | | 3/2001 | Rouhollahzadeh et al. |
| 6,216,129 B1 | | 4/2001 | Eldering |
| 6,223,291 B1 | | 4/2001 | Puhl et al. |
| 6,470,181 B1 | * | 10/2002 | Maxwell ........................ 455/413 |
| 6,505,046 B1 | * | 1/2003 | Baker ..................... G06Q 30/02 455/456.3 |
| 6,647,257 B2 | | 11/2003 | Owensby |
| 6,661,784 B1 | * | 12/2003 | Nykanen ...................... 370/338 |
| 6,857,024 B1 | * | 2/2005 | Chen ........................ H04L 29/06 379/114.13 |
| 7,068,775 B1 | * | 6/2006 | Lee ........................ H04M 3/428 379/265.02 |
| 2001/0005839 A1 | | 6/2001 | Maenpaa et al. |
| 2001/0011248 A1 | | 8/2001 | Himmel et al. |
| 2001/0013037 A1 | | 8/2001 | Matsumoto |
| 2001/0014911 A1 | | 8/2001 | Doi et al. |
| 2002/0116271 A1 | | 8/2002 | Mankoff |
| 2003/0182184 A1 | * | 9/2003 | Strasnick ............... G06Q 30/02 705/14.66 |
| 2012/0054786 A1 | * | 3/2012 | Kinder et al. .................. 725/23 |

FOREIGN PATENT DOCUMENTS

| | | |
|---|---|---|
| EP | 1066868 A2 | 1/2001 |
| EP | 1086732 A1 | 3/2001 |
| EP | 1087323 A1 | 3/2001 |

OTHER PUBLICATIONS

Graham, Ian S., HTML Sourcebook, Second Edition, John Wiley & Sons, Inc., 1996, pp. 106, 107, 588, and 589.
International Search Report for PCT/US01/15984.
Nokia WAP on Web, http:www.nokia.com/wap/index.html.
OANDA: Wireless Application Protocol (WAP) Service, http://america.oanda.com/site/wap.html.
Phone.com—The Best of the Internet on Your Phone—Home.
Taylor, Dave, Creating Cool web Pages with HTML, 2nd Edition, IDB Books Worldwide, Inc., 1995, pp. 100, 199, and 218.
U.S. Appl. No. 09/213,387 entire disclosure is hereby incorporated by reference, Dec. 12, 1998, pp. 5, line 19.
U.S. Office Action dated Apr. 28, 2003 in U.S. Appl. No. 09/574,254.
U.S. Office Action dated Sep. 10, 2003 in U.S. Appl. No. 09/574,254.
U.S. Advisory Action dated Feb. 2, 2004 in U.S. Appl. No. 09/574,254.
U.S. Office Action dated May 13, 2004 in U.S. Appl. No. 09/574,254.
U.S. Office Action dated Jan. 27, 2005 in U.S. Appl. No. 09/574,254.
U.S. Office Action dated Jun. 14, 2007 in U.S. Appl. No. 11/191,172.
U.S. Office Action dated Jan. 11, 2008 in U.S. Appl. No. 11/191,172.
U.S. Office Action dated Sep. 24, 2008 in U.S. Appl. No. 11/191,172.
U.S. Advisory Action dated Mar. 12, 2009 in U.S. Appl. No. 11/191,172.
U.S. Office Action dated Sep. 3, 2009 in U.S. Appl. No. 11/191,172.
U.S. Office Action dated Apr. 15, 2010 in U.S. Appl. No. 11/191,172.
U.S. Advisory Action dated Aug. 17, 2010 in U.S. Appl. No. 11/191,172.
Examiner's Answer to Appeal Brief dated Feb. 16, 2011 in U.S. Appl. No. 11/191,172.
Decision on Appeal dated Jul. 31, 2013 in U.S. Appl. No. 11/191,172.
U.S. Office Action dated Nov. 25, 2013 in U.S. Appl. No. 11/191,172.
U.S. Office Action dated Apr. 21, 2014 in U.S. Appl. No. 11/191,172.

* cited by examiner

COMPUTER NETWORK PAGE ADVERTISING METHOD

CROSS-REFERENCE TO RELATED APPLICATIONS

This application is a continuation of U.S. patent application Ser. No. 11/191,172, entitled "COMPUTER NETWORK PAGE ADVERTISING METHOD," and filed Jul. 27, 2005, now abandoned, which is a continuation of U.S. patent application Ser. No. 09/574,254, entitled "COMPUTER NETWORK PAGE ADVERTISING METHOD," and filed May 19, 2000, now abandoned, the entireties of which are incorporated herein by reference.

BACKGROUND OF THE INVENTION

1. Technical Field

This invention relates generally to methods and systems for advertising computer network pages that are accessible through a computer network. More particularly, the invention provides a method and system for broadcasting an audible advertisement for a computer network page and providing a convenient means for a user to access the advertised page when the user connects to the computer network.

2. Related Information

Conventional wireless mobile stations, such as cellular telephones and personal digital assistants, use the Wireless Application Protocol (WAP) for Internet communications. FIG. 1 shows a conventional configuration used by WAP enabled mobile stations 100 to access the Internet 102. A WAP gateway 104 receives requests from mobile station 100 for information provided on the Internet 102. WAP gateway 104 then gathers the appropriate Internet web page that is formatted in hypertext mark-up language (HTML) and converts the HTML format to wireless markup language (WML). Alternatively, some content providers make available WML content, which is retrieved by a WAP gateway and does not require any conversion. The "WAP page" is written in WML and transmitted to mobile station 100 using WAP.

The capabilities of the displays available on wireless mobile stations are limited and, as a result, WML has not been used to create the type of graphics and eye catching layouts associated with traditional Internet web pages. Display 106 includes a typical WAP front page menu for accessing pages on the Internet with a mobile station. WAP gateway 104 transmits the front page in response to a user's request to access the Internet. The front page menu consists of a linear textual list of available web pages. Because of the lack of graphics and other eye catching devices used by traditional Internet web pages, operators of pages designed for use by mobile station users have found it increasingly difficult to attract users to their pages and promote the services offered by their pages.

Therefore, there exists a need for a system and method that allows operators of computer network pages designed for wireless mobile stations to effectively promote their pages.

SUMMARY OF THE INVENTION

The present invention overcomes the aforementioned problems by providing methods and systems for promoting computer network pages, such as WAP and web pages, to users. In one embodiment of the invention, a method for promoting a computer network page is provided. The method includes transmitting an audible advertisement for a network page that is accessible through a computer network to a mobile station and providing a menu including a selection choice for the advertised network. Users may be provided with an incentive to listen to the advertisement.

A system for promoting and accessing computer network pages is provided in an alternative embodiment. The system includes a mobile station that allows a user to conduct telephone calls and connect to a computer network, a call management server and a gateway that provides a menu including a selection choice for connecting to the advertised computer network pages. The call management server includes a caller identification device that identifies a user, a profile database containing profile information of at least one user, an advertisement database containing audible advertisements for computer network pages on the computer network, a processor and a voice response unit. The processor receives the identification of the user from the caller identification device, retrieves the user's profile information from the profile database and selects an audible advertisement from the advertisement database based on the user's profile. The voice response unit outputs the selected advertisement and an identification of the corresponding computer network.

In yet another embodiment of the invention, a call management server receives an indication of the initiation of a telephone call and outputs a voice advertisement for a computer network page and the identification of a computer network page. The call management server includes a caller identification device that identifies a user, a profile database containing profile information of at least one user, an advertisement database containing audible advertisements for computer network pages, a processor and a voice response unit. The processor receives the identification of the user from the caller identification device, retrieves the user's profile information from the profile database and selects an audible advertisement from the advertisement database based on the user's profile. The voice response unit outputs the selected advertisement and an identification of the corresponding computer network.

Other features and advantages of the invention will become apparent with reference to the following detailed description and the figures.

DETAILED DESCRIPTION OF THE PREFERRED EMBODIMENTS

Figure 1:
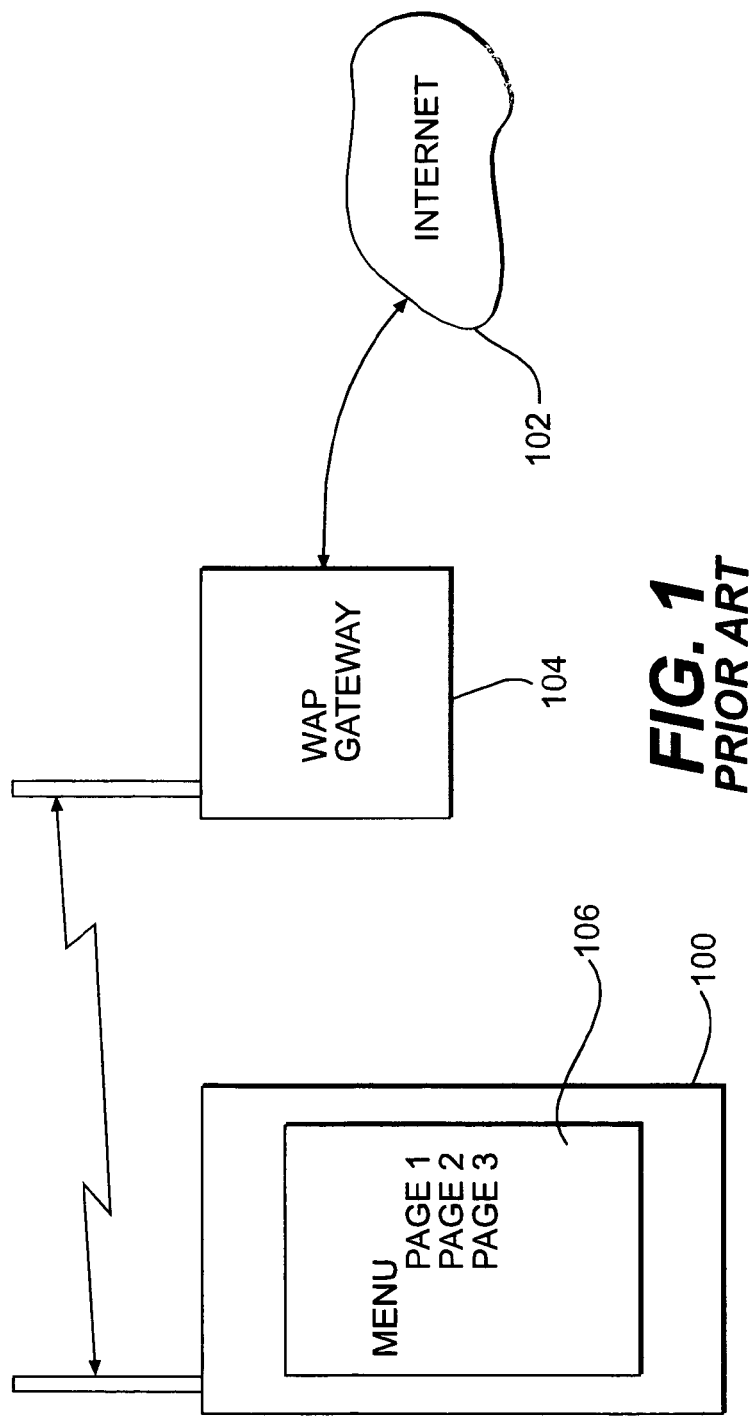
FIG. 1 shows a conventional wireless mobile station and configuration for connecting to the Internet.
Figure 2:
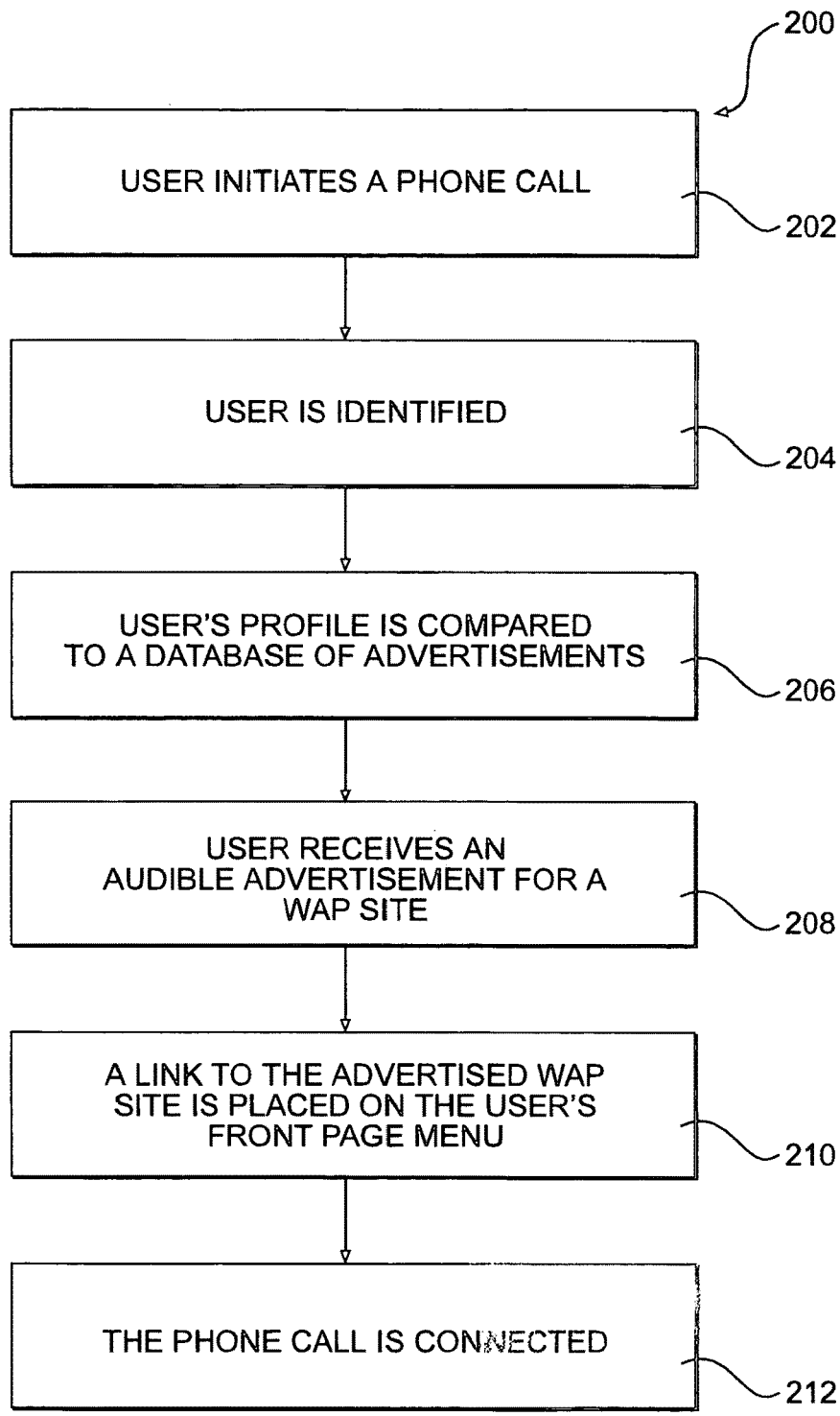
FIG. 2 shows a method for advertising a computer network page in accordance with a preferred embodiment of the invention.

FIG. 2 illustrates a method 200 for promoting a computer network page, such as a WAP page, in accordance with a preferred embodiment of the invention. Method 200 will first be described generally with reference to FIG. 2 and then a more detailed explanation will be given while referring to FIG. 3. Furthermore, the following description refers to WML, WAP sites and WAP pages for illustration purposes only and with the understanding that the invention may be implemented with a variety of languages, protocols and computer networks. Initially, in step 202, a user initiates a phone call. Next, in step 204, a call management server identifies the user placing the telephone call. The identification may be done with a caller identification device.

In step 206, a computer compares the user's profile information stored in a database of user profiles to advertisements stored in a database of advertisements. User profile information is described in detail below. The computer is programmed to make the comparison and choose an advertisement that may be of interest to the user. In particular, the computer will choose an advertisement for a WAP page that may be of interest to the user. In one embodiment, the database of user profiles or the database of advertisements tracks the advertisements chosen for a particular user so that the user will rot repeatedly receive the same advertisement.

The user receives an audible advertisement for a computer network page, such as a WAP page, in step 208. The advertisement may be a short message describing the features or services offered by the page. The advertisement may also include an incentive to encourage the user to visit the page, such as by offering a limited time discount for products and services offered through the page.

In step 210, a WAP gateway places a link to the advertised WAP page at the top of the user's WAP front page menu. Placing the link at the top of the user's WAP front page menu allows the user to conveniently connect to the WAP page without requiring the user to remember the particular address for the WAP page while listening to the advertisement.

Finally, in step 212, after the voice advertisement is played, the call is connected. The user may receive a discount on the price of making the phone call after listening to the advertisement. Method 200 is shown for illustration purposes and with the understanding that the present invention may be practiced with several modifications. In one alternative embodiment, the user is given the option of listening to an advertisement at any time and not merely before placing a call. Furthermore, the user may accumulate credits to be applied to subsequent telephone calls after listening to one or more advertisements. In another embodiment of the invention, the user is given the option of listening to one or more advertisements after receiving a call to earn credits to apply to any charges incurred in connection with the received call. Additional methods for encouraging users to listen to advertisements that may be used with the present invention are disclosed in copending U.S. patent application Ser. No. 09/213,387, filed Dec. 12, 1998, the entire disclosure of which is hereby incorporated by reference.

Figure 3:
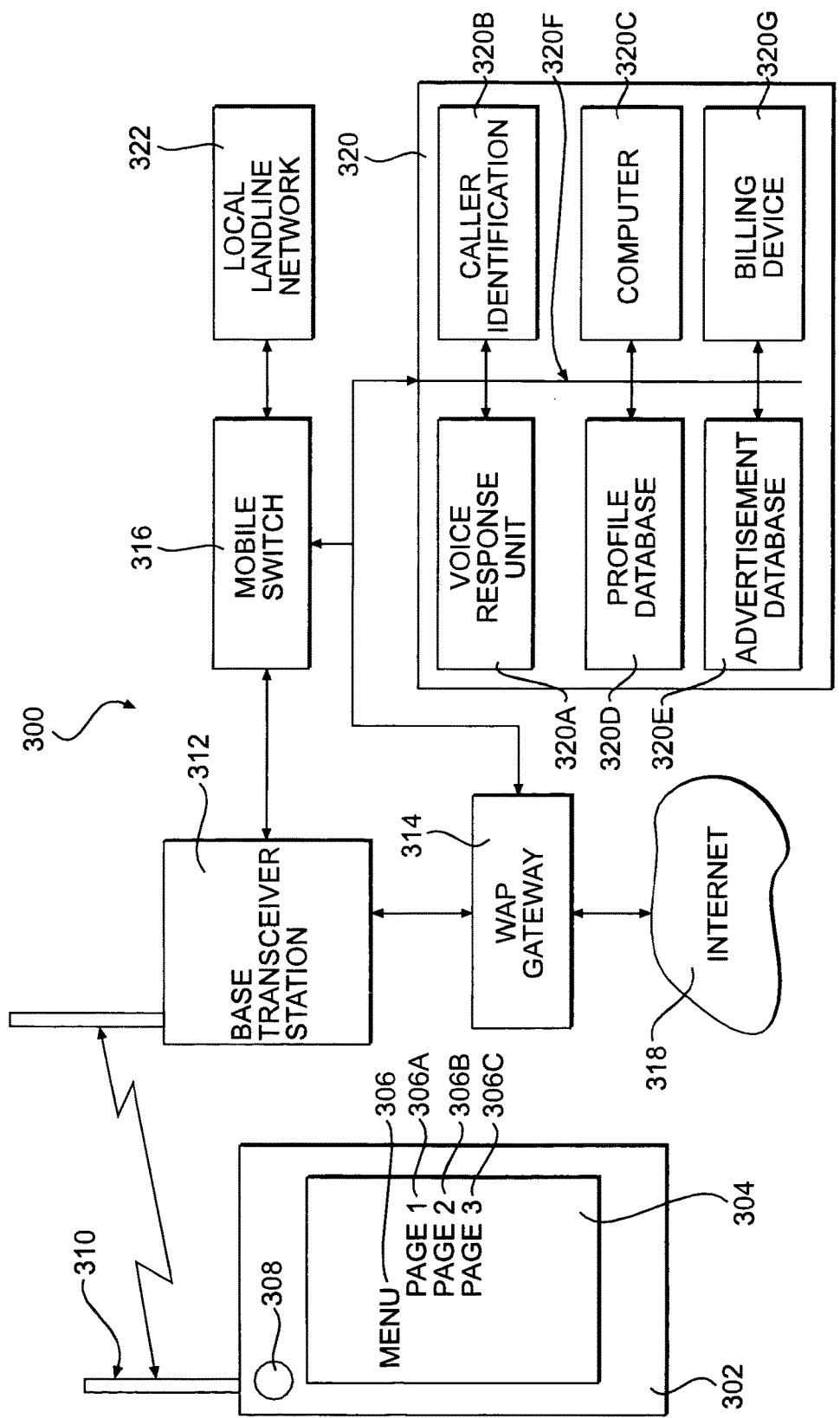
FIG. 3 shows a system for advertising and connecting to a wireless application protocol page in accordance with a preferred embodiment of the invention.

Turning now to FIG. 3, a system 300 that includes components for carrying out the method of FIG. 2 will be described. A user places telephone calls and connects to the Internet via a mobile station 302. Mobile station 302 may be a cellular telephone, personal digital assistant or any other device that allows the user to connect to the Internet and send and receive telephone calls. Mobile station 302 includes a display 304 that may be used to display WAP pages. Display 304 may be a liquid crystal display, plasma display or any other thin screen display suitable for use in a mobile station. FIG. 3 shows a WAP front page menu 306 on display 304. WAP front page menu 306 includes a list of hyperlinks 306A-306C that allow the user to display WAP pages. Mobile station 302 also includes a speaker 308 for listening and an antenna 310 for communicating with a base transceiver station 312.

Base transceiver station 312 is used to transmit data to and receive data from mobile station 302. A variety of conventional base transceiver stations may be used, including base transceiver stations that are part of conventional cellular telephone networks. Furthermore, additional conventional cellular telephone network components may be included, such as base station controllers.

Base transceiver station 312 is connected to a WAP gateway 314 and a mobile data switch 316. WAP gateway 314 is a conventional device and allows the mobile station 302 to connect to the Internet 318. In particular, WAP gateway 314 receives requests from mobile station 302 for information provided on the Internet 318, gathers the appropriate Internet web page that is formatted in HTML, converts the HTML format to WML and transmits the WAP page to mobile station 302 via base transceiver station 312. WAP gateway 314 also controls the content appearing on the mobile station's front page menu 306.

Mobile switch 316 connects the wireless mobile communications network to a call management server 320 and a local landline network 322, such as the Public Switched Telephone Network (PSTN). Mobile Switch 316 acquires wireless mobile communications originated or received by mobile station 302 and routes the communication between the base transceiver station 312, via a local landline network, to call management server 320. Mobile switch 316 acts in a known manner as an intelligent switch or other known intelligent network solution. Mobile switch 316 is programmed to identify and separate the communications that are to be provided with advertisements from communications that are not to be provided with advertisements. In one example, all outgoing calls from mobile station 302 are provided with advertisements, while all incoming calls to mobile station 302 are not provided with advertisements. Alternatively, certain users may be selected for advertisements, while others are not. Mobile switch 316 then connects mobile station 302 to call management server 320 when a communication is to be provided with an advertisement.

Calls received at call management server 320 are received by a voice response unit 320A. Voice response unit 320A initially receives and parks incoming calls and may utilize any known call holding and audio message insertion technology. Voice response unit 320A preferably comprises a plurality of ports for receiving, holding (also referred to in the art as "parking") and directing or re-directing the communications to mobile switch 316, or directly to its origin or destination terminal. Voice response unit 320A also includes a plurality of voice cards, or any other known technology that inserts an audio message into a parked communication, such as a non-analog, digital insertion device or system.

Call management server 320 includes a caller ID device 320B that identifies the phone number of a person making a phone call. It is assumed that one person will make most of the calls initiated by a given mobile station. However, call management server 320 may include additional components for identifying the user. In one embodiment, a voice recognition unit and database of voice samples of users likely to use a given mobile station may be used. Before placing a call, the user may be required to say her name. The user could then be identified from the voice signal.

A computer 320C controls the operation of call management server 320. Furthermore, the components shown as part of call management server 320 are connected to a common data bus 320F. After a call is received, parked and the identity of the caller is determined, the user's profile is retrieved from a database 320D of user profiles. Each profile preferably includes demographic and personal preference data pertaining to each user. For example, the demographic data may include standard demographic information such as age, gender, race and national origin. Additional demographic information determined by the advertisers may be included. The personal preference data may include general information relating to the individual preferences of the user, such as preferred types of WAP pages, computer and on-line related interests, preferred types of food and kinds of entertainment, as well as any specific hobbies or interests the user may have. The personal preference data may include additional personal preference information that may be relevant to WAP advertisers.

Computer 320C uses an algorithm to select an advertisement from a database 320E of advertisements that may be of interest to the user based on the user's profile. Many algorithms for matching advertisements to users are known to those skilled in the art and may be used when implementing the present invention. In one embodiment of the invention, each advertisement in database 320E is accompanied by an index of key words and the key words are used by computer 320C to find appropriate matches with user profiles. Computer 320C may determine a group of potential advertisements that match the user's profile and then randomly select an advertisement from the group. Advertisers may also be given the option of controlling how strict the algorithm will require a match to be before including the advertisement in the group of potential advertisements. For example, the algorithm may typically determine that there is a match between a profile and an advertisement when there is a score of 80. A particular advertiser may desire wide dissemination of the advertisement and therefore choose to have a match determined when there is a score of 70. Conversely, an advertiser may want to strictly target the advertisement and only want a match determined when there is a score of 90. The price charged to the advertiser for advertisements may be a function of the advertiser's distribution choice.

In an alternative embodiment, advertisements are selected in the order they are ranked by the algorithm. Advertisements may be removed from consideration for particular users after they have been selected by the user to prevent the user from repeatedly listening to the same advertisement. Alternatively, advertisers may be given the option of allowing advertisements to be directed at a particular user more than once for a predetermined fee.

Another algorithm in accordance with the present invention may incorporate six decision criteria. A first criteria (1) specifies how well the user's profile matches targeting criteria that may be specified by the advertiser. For example, each advertisement in database 320E may be accompanied by either a set of key words or other patterns that can be matched against a user's profile. Furthermore, advertisers may be given the option of limiting the dissemination of their advertisements by specifying profiles that match certain keywords or patterns. For example, an advertiser of alcoholic beverages may want to exclude users under 21 years old from hearing ads for alcoholic beverages. The advertiser can also specify keywords or patterns that they wish to match in a user profile and include numeric weights that indicate their level of importance of the keyword or pattern. The total strength of the profile match may be determined by adding the weights of all matching patterns. This gives each advertisement a numeric score that can be ranked against other ads to determine how well it fits the particular user.

A second criteria (2) specifies how well information inferred about the user matches targeting criteria specified by the advertiser. The algorithm may consider information that is supplementary to the user profile and inferred by the user's behavior on the system. Furthermore, the advertiser may be given the option of specifying keywords or patterns to be excluded or matched in the set of inferred information. For example, a user making a large number of calls can be considered a "heavy caller" and an advertiser may choose to exclude heavy callers.

A third criteria (3) specifies the location of the user. Base transceiver station 312 may provide the location of the user during a call and the advertiser may specify locations where he wishes the advertisement to be heard. One example of a method for determining the location of the user of a mobile station is found in copending U.S. patent application Ser. No. 09/213,387. The locations may be specific or, alternatively, the advertiser may be given the option of assigning preferences for a variety of locations. The algorithm may then consider the third criteria along with the other criteria.

A fourth criteria (4) specifies certain regional conditions. An advertiser may be given the option of assigning numeric weights to criteria applicable to all users in a region, such as day, time, traffic, or weather conditions. For example, the advertiser may specify that the ads should be heard only between 8:00 AM and 12:00 PM from Monday through Friday, or the advertiser may specify that the advertisement only be heard during inclement weather conditions. In one embodiment of the invention, information about regional conditions may be extracted automatically from information sources, such as those accessible through computer networks such as the Internet.

A fifth criteria (5) indicates advertisements that have already been heard by a user. An advertiser may be given the option of limiting the frequency or total number of times that a single user hears a particular advertisement. The algorithm may exclude advertisements that a specific user has listened to recently or has listened to a predetermined number of times.

A sixth criteria (6) specifies how many times the advertiser wants the ad played over a given period of time. An advertiser may be given the option of specifying the desired number of times an advertisement is to be played during some time period. If the actual rate of play is less than desired or more than desired, the algorithm may adjust a priority value for the advertisement. The priority may be a weighted value and the algorithm may monitor how often an advertisement is played and adjusts the weight periodically.

Each advertiser may be given the option of assigning preferences to one or more of the six criteria described above. The algorithm may then calculate a score for an advertisement based on a combination of any of the six weighted criteria. In one embodiment of the invention, the score is a function of the sum of the six weighted criteria values described above. The algorithm may then sort advertisements according to assigned scores and select the advertisement having the highest score.

The embodiment shown in FIG. 3 is used to determine advertisements at the time they are to be sent. However, call management server 320 may include an additional memory (not shown) that stores advertisements that are intended for particular users. For example, once a week call management server 320 may compare the profiles in database 320D to the advertisements in database 320E and produce an advertisement list that ranks a predetermined number of advertisements that are relevant to each user. With this embodiment of the invention, after a user has been identified, the next advertisement listed on that user's advertisement list is selected without requiring computer 320C to perform a comparison. In an alternative embodiment, a predetermined list of advertisements is only prepared for certain users. For example, call management server 320 may determine that particular users are active users of the system and prepare predetermined lists for the active users during non-peak times to minimize the drain on call management server 320 during peak times.

Selected advertisements are sent to voice response unit 320A. Voice response unit 320A transmits the selected advertisement in the form of an audio message, to mobile switch 316. Voice response unit 320A also sends a corresponding WAP page URL address to gateway 314. In one embodiment of the invention, the advertisement and identifying information are digitally packetized and each packet includes appropriate address information for directing the packets to mobile switch 316 and WAP gateway 314.

When an advertisement is selected and transmitted from call management server 320, the information is recorded in billing device 320G. Billing device 320G may use this information to bill advertisers when the fee charged to advertisers is a function of the frequency of the advertisement being played. Billing device 320G may also be used to track subsidies to apply to users. For example, a user may receive a fixed subsidy for listening to an advertisement. Alternatively, the subsidy may be a function of the length of the advertisement listened to by the user.

WAP gateway 314 inserts the WAP page URL addresses received from call management server 320 into the front page menu 306 created for mobile station 302. In particular, when a user desires to connect to the Internet, the user causes a signal identifying the user to be sent from mobile station 302 to WAP gateway 314 through base transceiver station 312. The identifying information may include the mobile station's electronic serial number (ESN). The WAP gateway then constructs a WAP page using a language such as WML for the particular user. The WML commands may include hyperlinks to previously advertised WAP pages. In one embodiment, hyperlinks to advertised WAP pages are listed in an order determined by the order that corresponding advertisements were listened to by the user. For example, "Page 1" 306A may correspond to the most recent advertisement and "Page 2" 306B may correspond to the next most recent advertisement. The user may receive an incentive, such as a subsidy for telephone charges, when the user connects to the advertised WAP page.

Therefore, after listening to an advertisement, a user can visit the advertised WAP page by connecting to WAP gateway 314 and selecting the first page listed on menu 306. Menu 306 may also contain hyperlinks to previously advertised sites. The user is not required to remember the address of the WAP page and the WAP page operator has an effective way to advertise the WAP page.

Mobile station 302 may also periodically connect to WAP gateway 314 and download an updated WAP front page menu 306 automatically. The menu may be stored in a local memory (not shown) of mobile station 302. With this embodiment, the user may retrieve an updated front page menu from the local memory and display the front page menu on screen 304. When the user selects a page from the front page menu, mobile station 302 connects to WAP gateway 314 and WAP gateway 314 accesses the desired page.

In an alternative embodiment, WAP gateway 314 links the user directly to the advertised WAP page when the user connects to the Internet. The user can then access front page menu 306 after connecting to the advertised WAP page. Alternatively, advertised WAP pages or advertisements for WAP pages may appear on screen 304 between WAP pages as the user navigates.

WAP pages may also be advertised with non-audible advertisements. For example, WAP gateway 314 may provide a short advertisement to be viewed on display 304 based on the user's profile when the user initially connects to the Internet. After viewing the advertisement, the user may then connect directly to the advertised WAP page or to front page menu 306. Users may be more likely to connect to the advertised page when they are in the process of connecting to the Internet. Furthermore, the user may request and listen to advertisements at times other than immediately before placing a telephone call.

A text message, such as one sent by short message service (SMS), may also be used to advertise a WAP page. The message may include a hyperlink to the advertised WAP page to allow the user to connect to the WAP page from the message. Advertisement of WAP pages may also be accomplished via electronic mail. The user may receive an electronic mail message describing a WAP page and containing a hyperlink to the WAP page.

The present invention may combine any of the described advertisement methods. For example, the user may originally receive a SMS message advertising a WAP page and then an audible advertisement at a later time. Furthermore, each user may be given the option of selecting one or more advertising methods.

Figure 4:
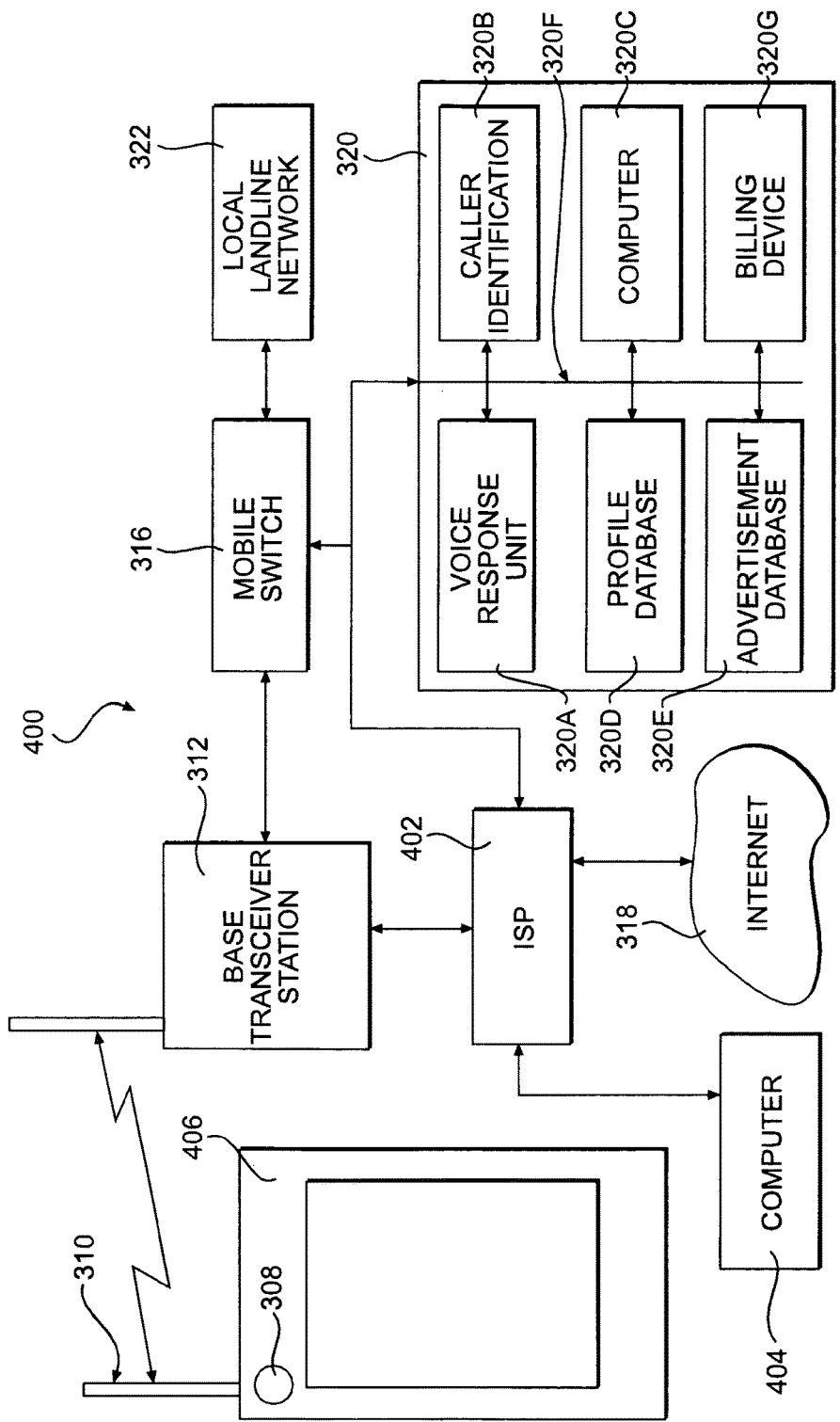
FIG. 4 shows a system for advertising and connecting to an Internet page in accordance with a preferred embodiment of the invention.

FIG. 4. shows a system 400 for promoting Internet pages that is similar to system 300, shown in FIG. 3. System 400 allows a user to receive audible advertisements for Internet pages. Only the differences between systems 300 and 400 will be described, with the understanding that operation of the components that are labeled the same in both figures is found above in the description of FIG. 3. Database 320E contains a database of Internet pages instead of WAP pages. Furthermore, call management server 320 sends the address of an advertised Internet page to an Internet services provider (ISP) 402. Internet service provider 402 replaces WAP gateway 314 and creates a custom web page for each user. A computer 404 is used to access the custom web page and the rest of the Internet.

System 400 operates by first sending an audible advertisement for an Internet page to the user of mobile station 406, in the manner described above. Mobile station 406 does not have to be configured to be connectable to a computer network. Call management server also sends the address of the advertised Internet page to ISP 402. ISP 402 then reconfigures the HTML code of the user's home page to include a link to the advertised page. Alternatively, ISP 402 may directly connect the user to the advertised page when the user connects to ISP 402. The user may then use computer 404 to connect to the Internet at any time after listening to the advertisement. Furthermore, computer 404 may be a typical stationary home computer and does not have to be connected to mobile station 406.

While the present invention has been described in connection with the illustrated embodiments, it will be appreciated and understood that modifications may be made without departing from the true spirit and scope of the invention.

The invention claimed is:

1. A method comprising:

selecting, by a server comprising a processor, advertisements to prepare a predetermined list of the advertisements for a user, wherein the predetermined list of the advertisements is based on at least one of demographic data related to the user or preference data related to the user, and wherein the advertisements are selected by the server to prepare the predetermined list of the advertisements during a non-peak time prior to when one of the advertisements from the predetermined list of the advertisements is to be sent to the user;

receiving, at the server, via a mobile switch, a telephone call from a mobile station associated with the user to a destination terminal, wherein the telephone call is received at the server prior to the telephone call being connected between the mobile station and the destination terminal;

parking, by the server, the telephone call;

while the telephone call is parked and prior to the telephone call being connected between the mobile station and the destination terminal, determining, by the server, based at least in part on the telephone call from the mobile station associated with the user, an identity of the user, wherein the identity of the user is further determined based on a comparison of a voice sample provided by the user at initiation of the telephone call with voice samples of users known to use to the mobile station, retrieving, by the server, based on the identity of the user, the predetermined list of the advertisements previously prepared for the user, selecting, by the server, an advertisement from the predetermined list of the advertisements previously prepared by the server for the user, wherein the advertisement is for a web page located at an address on a computer network, the web page formatted for display on a display of the mobile station, transmitting, by the server, to the mobile station, an audio message of the advertisement for the web page, wherein the audio message of the advertisement for the web page is played by the mobile station prior to the telephone call between the mobile station and the destination terminal being connected, sending, by the server, to a gateway, the address on the computer network for the web page associated with the advertisement, and inserting, by the gateway, using the address on the computer network for the web page associated with the advertisement, hyperlink to the web page associated with the advertisement into a front page menu created by the gateway for the mobile station, wherein the front page menu including the hyperlink for the web page associated with the advertisement is caused to be displayed on the display of the mobile station associated with the user when the user requests to access information on the computer network; and redirecting, by the server, the telephone call to the mobile switch to allow the telephone call from the mobile station to be connected to the destination terminal.

2. The method of claim 1, wherein the web page is a wireless application protocol page.

3. The method of claim 1, wherein the hyperlink for the web page associated with the advertisement is displayed on the display of the mobile station at a top of a list of hyperlinks for available web pages.

4. The method of claim 1, wherein selecting the advertisements to prepare the predetermined list of the advertisements for the user comprises determining, based at least in part on a targeting criteria specified by an advertiser and the at least one of the demographic data related to the user or the preference data related to the user, whether the user should be excluded from receiving the advertisement for the web page.

5. The method of claim 4, wherein the targeting criteria comprises a minimum age for receiving the advertisement for the web page.

6. The method of claim 1, further comprising tracking that the advertisement has been transmitted to the mobile station to prevent repeatedly sending the advertisement to the user.

7. The method of claim 1, wherein the audio message of the advertisement for the web page comprises features or services offered by the web page.

8. The method of claim 1, further comprising providing, by the server, a first incentive to the user when the user listens to the audio message of the advertisement for the web page; and providing, by the server, a second incentive to the user when the user selects the hyperlink for the web page to connect to the web page associated with the advertisement.

9. The method of claim 8, wherein the first incentive is a function of a length of the advertisement for the web page listened to by the user.

10. The method of claim 8, wherein the first incentive comprises providing a discount for at least a portion of charges incurred for the telephone call.

11. A system comprising:

a server comprising a processor, and a memory that stores instructions that, when executed by the processor, cause the processor to perform operations comprising selecting advertisements to prepare a predetermined list of the advertisements for a user, wherein the predetermined list of the advertisements is based on at least one of demographic data related to the user or preference data related to the user, and wherein the advertisements are selected by the server to prepare the predetermined list of the advertisements during a non-peak time prior to when one of the advertisements from the predetermined list of the advertisements is to be sent to the user, receiving, via a mobile switch, a telephone call from a mobile station associated with the user to a destination terminal, wherein the telephone call is received at the server prior to the telephone call being connected between the mobile station and the destination terminal, parking the telephone call, while the telephone call is parked and prior to the telephone call being connected between the mobile station and the destination terminal, determining, based at least in part on the telephone call from the mobile station associated with the user, an identity of the user, wherein the identity of the user is further determined based on a comparison of a voice sample provided by the user at initiation of the telephone call with voice samples of users known to use to the mobile station, retrieving, based on the identity of the user, the predetermined list of the advertisements previously prepared for the user, selecting an advertisement from the predetermined list of the advertisements previously prepared by the server for the user, wherein the advertisement is for a web page located at an address on a computer network, the web page formatted for display on a display of the mobile station, transmitting, to the mobile station, an audio message of the advertisement for the web page, wherein the audio message of the advertisement for the web page is played by the mobile station prior to the telephone call between the mobile station and the destination terminal being connected, and sending, to a gateway, the address on the computer network for the web page associated with the advertisement; and the gateway, wherein the gateway performs gateway operations comprising inserting, using the address on the computer network for the web page associated with the advertisement, a hyperlink to the web page associated with the advertisement into a front page menu created by the gateway for the mobile station, wherein the front page menu including the hyperlink for the web page associated with the advertisement is caused to be displayed on the display of the mobile station associated with the user when the user requests to access information on the computer network, wherein the operations further comprise redirecting the telephone call to the mobile switch to allow the telephone call from the mobile station to be connected to the destination terminal.

12. The system of claim 11, wherein selecting the advertisements to prepare the predetermined list of the advertisements for the user comprises determining, based at least in part on a targeting criteria specified by an advertiser and the at least one of the demographic data related to the user or the preference data related to the user, whether the user should be excluded from receiving the advertisement for the web page.

13. The system of claim 12, wherein the targeting criteria comprises a minimum age for receiving the advertisement for the web page.

14. The system of claim 11, wherein the operations further comprise tracking that the advertisement has been transmitted to the mobile station to prevent repeatedly sending the advertisement to the user.

15. The system of claim 11, wherein the audio message of the advertisement for the web page comprises features or services offered by the web page.

16. The server system of claim 11, wherein the hyperlink for the web page associated with the advertisement is displayed on the display of the mobile station at a top of a list of hyperlinks for available web pages.

17. The server system of claim 11, wherein the operations further comprise:

providing a first incentive to the user when the user listens to the audio message of the advertisement for the web page, and providing a second incentive to the user when the user selects the hyperlink for the web page to connect to the web page associated with the advertisement.

18. The system of claim 17, wherein the operations further comprise tracking the first incentive and the second incentive to apply to the user.

19. The system of claim 17, wherein the first incentive is a function of a length of the advertisement for the web page listened to by the user.

* * * * *